United States Patent
Roussey et al.

(10) Patent No.: US 11,130,587 B2
(45) Date of Patent: Sep. 28, 2021

(54) THROTTLE CONTROL SYSTEM FOR AN AIRCRAFT

(71) Applicants: Bastien Roussey, Tain l'hermitage (FR); Rachid Elfagrouchi, Montoison (FR)

(72) Inventors: Bastien Roussey, Tain l'hermitage (FR); Rachid Elfagrouchi, Montoison (FR)

(73) Assignee: LORD Corporation, Cleveland, OH (US)

( * ) Notice: Subject to any disclaimer, the term of this patent is extended or adjusted under 35 U.S.C. 154(b) by 645 days.

(21) Appl. No.: 16/027,531

(22) Filed: Jul. 5, 2018

(65) Prior Publication Data

US 2019/0009921 A1 Jan. 10, 2019

(30) Foreign Application Priority Data

Jul. 5, 2017 (FR) ...................................... 1756332

(51) Int. Cl.
*B64D 31/06* (2006.01)
*B64D 31/04* (2006.01)
*G05G 5/03* (2008.04)
*G05G 11/00* (2006.01)
*G05G 1/04* (2006.01)
(Continued)

(52) U.S. Cl.
CPC ............. *B64D 31/06* (2013.01); *B64D 31/04* (2013.01); *G05G 1/04* (2013.01); *G05G 5/03* (2013.01); *G05G 11/00* (2013.01); *F16H 1/14* (2013.01); *G05G 2009/0477* (2013.01)

(58) Field of Classification Search
CPC ........ B64D 31/06; B64D 31/04; G05G 11/00; G05G 1/04; G05G 2009/0477; F16H 1/14
See application file for complete search history.

(56) References Cited

U.S. PATENT DOCUMENTS 3,353,480 A 11/1967 Lowell et al.
3,599,510 A * 8/1971 Scott, Sr. ................ F16D 13/10
74/625

(Continued)

FOREIGN PATENT DOCUMENTS

DE 199 26 800 12/2000
EP 0 265 738 5/1988
(Continued)

OTHER PUBLICATIONS

French Patent Office, Written Opinion for Application No. FR17546332 dated Jul. 5, 2017, 5 pgs.

*Primary Examiner* — Brian M O'Hara
*Assistant Examiner* — Keith L Dixon
(74) *Attorney, Agent, or Firm* — Richard G. Miller; John A. Molnar

(57) ABSTRACT

The invention relates to an improved throttle control system for an aircraft. The throttle system includes providing friction to the throttle to maintain the position of the throttle until the pilot overcomes the friction by using force to move the throttle. The throttle is attached to and positioned about a shaft to provide rotatable movement. The invention uses a first and second friction resistance to maintain the position of the throttle along with an automatic regulating device capable of automatically controlling rotation of the shaft having a geared motor assembly.

10 Claims, 1 Drawing Sheet

(51) Int. Cl.
  *F16H 1/14* (2006.01)
  *G05G 9/047* (2006.01)

(56) References Cited

U.S. PATENT DOCUMENTS

| | | | | |
|---|---|---|---|---|
| 4,283,965 A * | 8/1981 | Hansen | ............... | B60K 26/00 |
| | | | | 74/482 |
| 4,516,063 A * | 5/1985 | Kaye | ............... | B60K 26/021 |
| | | | | 318/685 |
| 4,567,786 A * | 2/1986 | Sakurai | ............... | B64D 31/04 |
| | | | | 244/220 |
| 4,651,954 A * | 3/1987 | Miller | ............... | B64D 31/06 |
| | | | | 244/234 |
| 4,947,070 A * | 8/1990 | Hill | ............... | B64D 31/04 |
| | | | | 310/80 |
| 5,488,824 A * | 2/1996 | LeDoux | ............... | B64D 31/00 |
| | | | | 244/234 |
| 6,973,915 B1 | 12/2005 | Henle | | |
| 2019/0176997 A1* | 6/2019 | Lambton | ............... | B64D 31/04 |

FOREIGN PATENT DOCUMENTS

| | | |
|---|---|---|
| EP | 0 657 350 | 6/1995 |
| EP | 1 958 870 | 8/2008 |
| FR | 2 956 225 | 8/2011 |

\* cited by examiner

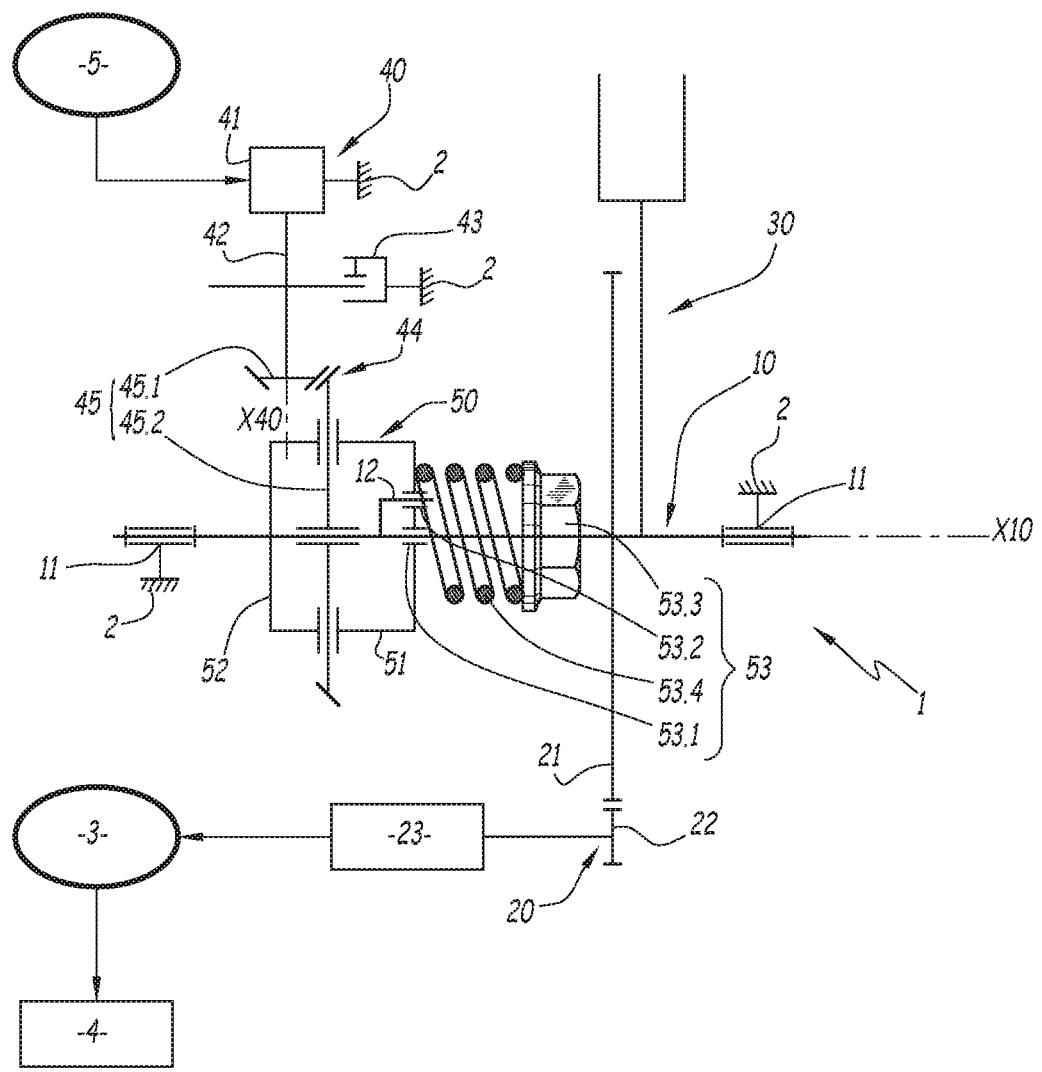

THROTTLE CONTROL SYSTEM FOR AN AIRCRAFT

CROSS-REFERENCE TO RELATED APPLICATIONS

This application claims the benefit of French Patent Application No. FR1756332 filed Jul. 5, 2017, the disclosure of which is incorporated herein by reference in its entirety.

TECHNICAL FIELD

The present invention relates to a throttle control system for an aircraft.

BACKGROUND

To control the power plant of an aircraft, in particular an airliner, it is known to use a throttle that provides the power plant with data relative to the angular position of a shaft around a central axis of the throttle. The shaft is mounted, so as to be able to rotate around its axis, on a frame of the aircraft, while being securely connected to an actuating lever that is in turn connected to a control lever, referred to as the throttle, on which the pilot can act manually. By using the control lever to drive the actuating lever, the pilot rotates the shaft relative to the frame, the variation in the angular position of the shaft around its axis being measured physically by an ad hoc device capable of sending the corresponding measurement results in the form of an electric signal to an engine control device, which conditions this signal and commands the thrust produced by the power plant accordingly, depending on the direction and amplitude of the driving of the throttle. A friction link is functionally inserted without play between the frame and the shaft. In this way, without inducing stress on the throttle, the shaft retains a fixed angular position, which allows the pilot to release the throttle while being sure that the propulsion thrust he has set will be maintained. In order for the pilot to rotate the shaft while acting on the throttle, the pilot must exceed the resistance that this friction link applies to frictionally prevent the shaft from being driven relative to the frame.

Furthermore, in particular in modern airliners, such a throttle control system must be able to provide automatic regulation, by replacing, when desired by the pilot, the action by the pilot on the throttle. This automatic regulation is provided by an ad hoc device, which is sometimes called "auto throttle", abbreviated "AT". This AT device does not directly connect an on-board computer of the aircraft to the engine control device. Instead, the AT device acts mechanically on the aforementioned control shaft to rotate it, which also drives the actuating lever in a corresponding manner, and thereby drives the throttle in turn, the movement of which can be observed by the pilot. For safety reasons, the pilot must be able, at any time and including when the "AT" device is engaged, to act manually on the lever and thus to control the position of the aforementioned shaft as a priority using the AT device. To that end, the drive outlet of a geared motor assembly of the AT is irreversibly coupled to the shaft via the aforementioned friction link. In other words, the anchoring point of the friction link is formed by an irreversible coupling piece, through which the drive outlet transmits its movement to the shaft. In practice, this irreversible coupling is generally done by a worm screw that is securely connected in rotation to the drive outlet and which, for example, meshes in a crown against which the shaft rubs while applying the resistance of the friction link. The meshing of this worm screw and this crown being irreversible in that the worm screw can drive the crown but the crown cannot drive the worm screw due to the friction between them, the angle of the helix of the worm screw, etc. The irreversibility of this coupling means that, as long as the pilot does not, via the throttle, oppose resistance greater than the resistance of the friction link, the worm screw can drive the control shaft via the crown and the friction link, without the reverse driving being possible.

This being the case, the use of such an irreversible coupling, in particular done by the aforementioned worm screw, inadvertently induces play in this coupling. Even if this play is small, it is not acceptable in an aircraft throttle control system, since even an infinitesimal variation in the angular positioning of the control shaft resulting from the action of the AT device leads to propelling the aircraft with thrust that cannot be adjusted precisely enough. To get around this issue and ensure transmission without play for the coupling of the AT device, it is known either to add a friction link between the crown and the frame, or to use a spring to press the teeth of the worm screw against those of the crown. In the first case, the geared motor assembly of the AT device must be oversized to overcome the resistance of the added friction link. In the second case, the higher contact pressures associated with the high slipping speeds between the teeth of the worm screw and the crown cause wearing of these teeth in the long term. In both cases, the risk of failure of the AT device is therefore increased and the lifetime of the device is reduced.

The aim of the present invention is to improve throttle control systems incorporating an AT device, while limiting the risks of failure of this AT device and increasing its lifetime.

SUMMARY

In one aspect, a throttle control system for an aircraft is provided. The throttle control system comprising a main shaft, a lever, a friction link, and an automatic regulating device. The main shaft having a main axis, the main shaft being rotatably mounted to a frame of the aircraft such that the main shaft is able to rotate freely around the main axis, wherein an angular position of the main shaft around the main axis is configured to control a propulsion of the aircraft. The lever is securely and rotatably connected around the main axis of the main shaft and capable of being manually actuated. The friction link is positioned without play between the main shaft and the frame and configured to apply a first resistance, wherein the first resistance is friction being exerted on the main shaft, the friction preventing the main shaft from being rotated around the main axis relative to the frame, wherein the first resistance may manually be overcome by a pilot acting manually on the lever to rotate the main shaft around the main axis. The automatic regulating device is capable of automatically controlling rotation of the main shaft around the main axis, the automatic regulating device further comprising a geared motor assembly, a mechanical coupling, and a brake. The geared motor assembly is fixedly supported by the frame and having an output that is able to be moved relative to the frame by a motor and a reducing gear of the geared motor assembly. The mechanical coupling is suitable for reversibly transmitting, without play, movement between the output of the geared motor assembly and the main shaft via the friction link, so as, by actuating the geared motor assembly, to rotate the main shaft around the main axis relative to the frame as long as a resistance to this rotation remains below the first resistance. The brake is separate from the mechanical coupling, the brake being fixedly supported by the frame and being suitable for preventing movement driving for the output of the geared motor assembly relative to the frame by applying a second resistance that is greater than the first resistance.

According to additional advantageous features of the control system according to the invention, considered alone or according to any technically possible combination(s). In one embodiment, the output of the geared motor assembly is rotatable around a secondary axis, and the mechanical coupling comprises a reversible gear pair without play, including a first gear wheel, securely connected in rotation around the secondary axis to the output of the geared motor assembly, and a second gear wheel, securely connected in rotation around the main axis to the main shaft by the friction link. In one embodiment, the secondary axis extends perpendicular to the main axis, and the gear pair is conical or is integrated into a bell crank. In one embodiment, the friction link includes at least one friction piece which is securely connected to the main shaft both in rotation around the main axis and in translation around the main axis, and rubs without play against the second gear wheel so as to generate the first resistance between the second gear wheel and the friction piece. In one embodiment, two friction pieces are provided that are arranged on either side, along the main axis, of the second gear wheel. In one embodiment, the at least one friction piece is connected to the main shaft by an assembly device that is suitable both for blocking the friction piece and the main shaft in rotation without play around the main axis relative to one another, and for resiliently pressing the at least one friction piece against the second gear wheel. In one embodiment, the brake is a friction brake preventing, by friction, the output of the geared motor assembly from being moved. In one embodiment, the brake is passive, so as to apply the second resistance both when the geared motor assembly moves the output and when the geared motor assembly does not move the output. In one embodiment, the brake is active, so as to apply the second resistance only when the geared motor assembly does not move the output. In one embodiment, the brake is designed so that in case of seizing of the friction link, the second resistance can be exceeded by the pilot acting manually on the lever to rotate the main shaft around the main axis.

The invention will be better understood upon reading the following description, provided solely as an example and done in reference to the drawings, in which FIG. 1 is a diagram of a control system according to the invention.

BRIEF DESCRIPTION OF THE DRAWINGS

FIG. 1 shows a system 1 making it possible to control the throttle of an aircraft, in particular an airliner.

DETAILED DESCRIPTION

The system 1 comprises a main shaft 10 defining a main axis X10, along which the main shaft 10 extends and along which this shaft is centered. The main shaft 10 is mounted rotating along the main axis X10 relative to a frame 2 of the aircraft, for example via bearings 11, or more generally, any member providing the free rotation of the main shaft 10 around the main axis X10 relative to the frame 2.

The control system 1 also includes a measuring device 20 making it possible to physically measure the angular position of the main axis 10 around the main axis X10. By way of illustrative and non-limiting example, this measuring device 20 includes a large wheel 21, which is securely connected in rotation around the main axis X10 to the main shaft 10 and which drives, for example by meshing without play, a pinion 22 of a sensor 23 producing signals representative of the angular position of its pinion 22 and therefore the large wheel 21 and the main shaft 10. As those skilled in the art know, the term "without play" means a tolerancing of the connection so as to be without mechanical backlash. The measuring device 20 sends the result of the measurement that it carries out, for example sends the signals produced by the sensor 23, to an engine control device 3, commonly called FADEC (Full Authority Digital Engine Control). The engine control device 3 is provided to condition and process this measurement result and control a geared motor assembly 4 of the aircraft accordingly so as to set the thrust produced by this geared motor assembly based on the angular position of the main shaft 10 around the main axis X10. The technical considerations relative to the measuring device 20 and the engine control device 3, as well as the control of the propulsion of the aircraft based on the angular position of the main axis 10 around the main axis X10, will not be outlined further here, since they are part of the known art and are not limiting with respect to the invention.

In order for a pilot on board the aircraft to be able to act manually on the angular position of the main shaft 10 around the main axis X10, the control system 1 comprises a lever 30. This lever 30 makes it possible to actuate the main shaft, while being secured in rotation around the main axis X10 to the main shaft 10. Furthermore, this lever 30 can be actuated manually by the pilot, while being connected to a lever able to be manipulated directly by the pilot, commonly called throttle. Here again, the technical considerations relative to the lever 30 and its connection to the throttle will not be described in more detail, since they are part of the known art and are not limiting with respect to the invention.

The control system 1 also comprises an automatic regulating device 40, which is capable of automatically commanding the rotating of the main shaft 10 around the main axis 10. This automatic regulating device 40 therefore makes it possible to replace, with respect to the main shaft 10, the action of the pilot on the lever 30, with the understanding that the engagement of this automatic regulating device 40 is decided on by the pilot. In connection with the considerations developed in the introduction to this document, it is understood that the automatic regulating device 40 is comparable to a so-called AT device, in other words, an "auto throttle" device.

The automatic regulating device 40 comprises a geared motor assembly 41, which, as schematically indicated in FIG. 1, is fixedly supported by the frame 2. The geared motor assembly 41 incorporates both an engine, controlled by the on-board computer 3, and a reducing gear, for example made up of gear pairs, transmitting, reversibly and with a defined speed reducing ratio, the movement produced by the motor to a mechanical output 42 of the geared motor assembly 41. The activation of the geared motor assembly 41 is controlled by the pilot, in that the engagement by the pilot of the automatic regulating device 40 enables an activation of the geared motor assembly 41, in particular by supplying energy to the motor of the latter so that this motor can respond to command instructions from an on-board computer 5 of the aircraft, while the disengagement by the pilot of the automatic regulating device 40 deactivates the geared motor assembly 41. The aspects relative to the on-board computer 5, in particular its automatic piloting functions, will not be described in detail here, since they are known, as such, in the field of modern airplanes.

According to one preferred embodiment that is implemented in the example embodiment of FIG. 1, the output 42 of the geared motor assembly 41 is able to be rotated, by the motor and the reducing gear of this geared motor assembly, around a secondary axis X40, the output 42 then forming an output shaft rotating around itself around this secondary axis X40. In the embodiment of FIG. 1, the secondary axis X40 extends perpendicular to the main axis X10.

The regulating device 40 also includes a brake 43 that is supported fixedly by the frame 2. The brake 43 is suitable for preventing the output 42 of the geared motor assembly 41 from being moved relative to the frame 2, to that end applying a mechanical resistance, called resistance R40 hereinafter.

The embodiment of the brake 43 is not limiting with respect to the invention. According to one preferred embodiment, this brake 43 is a friction brake, using friction to prevent the output 42 of the geared motor assembly 41 from being moved: as shown schematically in FIG. 1, the brake 43 can for example act by friction against the periphery of a wheel connected securely in rotation around the secondary axis X40 to the output 42.

The automatic regulating device 40 further includes a mechanical coupling 44 that make it possible to transmit, without play and reversibly, the movement between the output 42 of the geared motor assembly 41 and the main shaft 10 via a friction link 50 arranged between the main shaft 10 and the coupling 44. In other words, the coupling 44 transmit the movements without play, both in one direction and the opposite direction, between the output 42 and the friction link 50, the latter connecting, by friction, the coupling 44 to the main shaft 10 while thus being functionally interposed without play between the main shaft 10 and the frame 2 via the automatic regulating device 40. The friction link 50 is designed to prevent, by friction, the main shaft 10 from being rotated around the main axis X10 by applying a resistance, called resistance R50 hereinafter, that is smaller, for example twice as small, or even more, then the resistance R40. It is therefore understood that both when the automatic regulating device 40 is deactivated and when this automatic regulating device is activated, the pilot, wishing to modify the throttle command of the aircraft, must overcome the resistance R50 to rotate the main shaft 10, by acting manually on the lever 30 through the aforementioned throttle. It is also understood that, when the automatic regulating device 40 is activated, this automatic regulating device may, depending on the command instructions sent by the onboard computer 5 to the geared motor assembly 41, provide a rotation of the main shaft 10 around the main axis X10, but only as long as a resistance to this rotation remains below the resistance R50 and the friction link 50 therefore keep the link fixed in rotation between the main shaft 10 and the coupling 44: once the pilot applies, to the main shaft 10 by acting on the lever 30, a resistance greater than the resistance R50, the pilot breaks the driving link between the main shaft 10 and the coupling 44 at the friction link 50.

According to one preferred embodiment, which is implemented in the example of FIG. 1, the coupling 44 comprises a gear pair 45, reversible and without play, including a gear wheel 45.1, which may be comparable to a pinion, that is securely connected in rotation around the secondary axis X40 to the output 42 of a geared motor assembly 41, the securing between the gear wheel 45.1 and the output 42 for example being able to be done by direct engagement between them; and a gear wheel 45.2, securely connected in rotation around the main axis X10 to the main shaft 10 by the friction link 50.

In practice, the embodiment of the gear pair 45 is not limiting, as long as it is reversible and free from play. Thus, the respective teeth of the wheels 45.1 and 45.2 can be provided to be straight, helical, etc.

For the embodiment considered in FIG. 1, in which the main axis X10 and the secondary axis X40 extend perpendicular to one another, the gear pair 45 can advantageously be provided to be conical or integrated into a bell crank.

Also according to one preferred embodiment, implemented in FIG. 1, the friction link 50 includes one or several friction pieces, two such friction pieces 51 and 52 being provided in the example embodiment of FIG. 1, while being arranged on either side, along the main axis X10, of the gear wheel 45.2. Each of the friction pieces 51 and 52 is securely connected to the main shaft 10 both in rotation around the main axis X10 and in translation around the main axis. Furthermore, each of the friction pieces 51 and 52 rubs without play against the gear wheel 45.2 so as to generate resistance R50 between this gear wheel 45.2 and the friction pieces 51 and 52. As indicated schematically in FIG. 1, the friction between the gear wheel 45.2 and each of the friction pieces 51 and 52 can for example use planar contact, having stressed that, alternatively, other embodiments can be considered for the friction interfaces without play between the gear wheel 45.2 and the friction pieces 51 and 52, more generally between the coupling 44 and the friction link 50.

According to one particularly advantageous practical arrangement, the friction piece 52 is directly engaged with the main shaft 10, while the friction piece 51 is connected to the main shaft 10 by an assembly device 53 that provides both the pressing of the friction interface between the friction piece 51 and the gear wheel 45.2 and the rotational blocking between this friction piece 51 and the main shaft 10. In the embodiment illustrated in FIG. 1, this assembly device 53 comprises a guideway 53.1, a guideway 53.2, a nut 53.3, and a compression spring 53.4. The guideway 53.1 forms a guideway link, along the main axis X10, between the friction piece 51 and the main shaft 10. The guideway 53.2 forms a guideway link, along an axis parallel to and offset from the main axis X10, between the friction piece 51 and an off-centered arm 12 of the main shaft 10. The nut 53.3 is screwed on the main shaft 10 and which, during use, is blocked by a locknut or a similar stop. The compression spring 53.4 is inserted, along the main axis X10, between the nut 53.3 and the friction piece 51.

Irrespective of the embodiment of the assembly device 53, it is understood that it makes it possible both to block, without play, the rotation around the main axis X10 between the friction piece 51 the main shaft 10, and to resiliently press the friction piece 51 against a gear wheel 45.2 substantially along the main axis X10. In this way, the production and adjustment of the resistance R50 can be done easily and precisely.

Taking into account the explanations given thus far, it will be understood that the automatic regulating device 40 differs from the AT device described in the introduction of the present document in that its coupling 44 performs a reversible coupling between the output 42 of the geared motor assembly 41 and the main shaft 10. Such reversible coupling is easily provided without play, for example by using the gear pair 45, without generating any wear problems due to the fact that the travel and the sliding speed within such a reversible coupling, for example between the respective teeth of the gear wheels 45.1 and 45.2, are respectively lower than within an irreversible coupling, for example between the respective teeth of a worm screw and a crown engaged on this worm screw. The wear of the automatic regulating device 40 is substantially reduced as a result, which increases its lifetime and limits the risk of failure thereof. Furthermore, since the anchoring of the automatic regulating device 40 is not provided by an irreversibility of this coupling 44, the automatic regulating device 40 is anchored, with respect to the frame 2, by the brake 43, which, as schematically indicated in FIG. 1, is separate from the coupling 44. Since the resistance R50 applied by this brake 43 is greater than the resistance R50 produced by the friction link 50, the pilot does not see the reversibility of the coupling 44, in that, with respect to the pilot, the entire automatic regulating device 40 is anchored to the frame 10 when the pilot acts manually on the lever 30 until exceeding the resistance R50 in order to rotate the main shaft 10.

It will be noted that the arrangement, in a way in series, of the resistances R50 and R40 with respect to the pilot of the aircraft, procures an additional safety advantage. In the case of seizing of the friction link 50, the pilot remains able to rotate the main shaft 10 by acting manually on the lever 30, by reversible forcing of the automatic regulating device 40, once the pilot can exceed the resistance R40 applied by the brake 43. In practice, this goes through an ad hoc arrangement and/or seizing of the brake 43, guaranteeing that the pilot can exceed the resistance R40 in case of failure of the friction link 50 causing the main shaft 10 to be secured permanently to the coupling 44. Since the automatic regulating device 40 is very regularly activated during the lifetime of the aircraft, any failure in the brake 43 will be detected quickly, without the aircraft running a risk, since the latter can still be piloted manually.

According to a secondary aspect of the invention, the brake 43 can be provided to be either passive or active. In other words, in a first possible embodiment according to which the brake 43 is passive, this brake applies the resistance R40 both when the geared motor assembly 41 drives the output 42 and when the geared motor assembly does not drive this output: it will be understood that in this embodiment, the geared motor assembly must, to effectively drive its output 42, overcome the resistance R40. According to a second possible embodiment in which the brake 43 is active, for example with a power shortage, this brake only applies the resistance R40 when the geared motor assembly 41 does not drive its output 42.

Various arrangements and alternatives to the control system 1 described thus far may also be considered. Rather than being perpendicular to the main axis X10, the secondary axis X40 can form an angle different from 90° with the main axis X10, or may even extend parallel to the main axis X10; of course, the coupling 44 is adapted accordingly. In addition to or alternatively, using drive kinematics other than a rotation around the secondary axis X40 can be considered for the output 42 of the geared motor assembly 41. In this case, the coupling 44 is adapted accordingly.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

The invention claimed is:

1. A throttle control system for an aircraft comprising:

a main shaft (10) having a main axis (X10), the main shaft (10) being rotatably mounted to a frame (2) of the aircraft such that the main shaft (10) is able to rotate freely around the main axis (X10), wherein an angular position of the main shaft (10) around the main axis (X10) is configured to control a propulsion of the aircraft;

a lever (30) securely and rotatably connected around the main axis (X10) of the main shaft (10) and capable of being manually actuated;

a friction link (50) positioned without clearance between the main shaft (10) and the frame (2), the friction link (50) configured to apply a first resistance, wherein the first resistance is friction being exerted on the main shaft (10) whereby the friction prevents the main shaft (10) from being rotated around the main axis (X10) relative to the frame (2), wherein the first resistance may be manually overcome by a pilot acting manually on the lever to rotate the main shaft around the main axis;

an automatic regulating device (40) capable of automatically controlling rotation of the main shaft (10) around the main axis (X10), the automatic regulating device (40) further comprising:

a geared motor assembly (41) fixedly supported by the frame (2) and having a mechanical output (42) that is able to be moved relative to the frame (2) by a motor and a reducing gear of the geared motor assembly (41);

a mechanical coupling (44) which is capable of reversibly transmitting, without clearance, movement between the mechanical output (42) of the geared motor assembly (41) and the main shaft (10) via the friction link (50), so as, by actuating the geared motor assembly (41), to rotate the main shaft (10) around the main axis (X10) relative to the frame (2) as long as a resistance to this rotation remains below the first resistance; and a brake (43) that is separate from the mechanical coupling (44), the brake (43) being fixedly supported by the frame (2) and able to prevent driving of the mechanical output (42) of the geared motor assembly (41) relative to the frame (2) by applying a second resistance that is greater than the first resistance.

2. The control system according to claim 1, wherein the mechanical output (42) of the geared motor assembly (41) is rotatable around a secondary axis (X40), and the mechanical coupling (44) comprises a reversible and without clearance gear pair (45), including a first gear wheel (45.1), securely connected in rotation around the secondary axis (X40) to the mechanical output (42) of the geared motor assembly (41), and a second gear wheel (45.2), securely connected in rotation around the main axis (X10) to the main shaft (10) by the friction link (50).

3. The control system according to claim 2, wherein the secondary axis (X40) extends perpendicular to the main axis (X10), and wherein the gear pair (45) is conical or is integrated into an angular gearing.

4. The control system according to claim 2, wherein the friction link (50) includes at least one friction piece (51, 52) securely connected to the main shaft (10) both in rotation around the main axis (X10) and in translation around the main axis (X10), and rubs without clearance against the second gear wheel (45.2) so as to generate the first resistance between the second gear wheel (45.2) and the at least one friction piece (51, 52).

5. The control system according to claim 4, wherein two friction pieces (51, 52) are arranged on either side of the second gear wheel (45.2) along the main axis (X10).

6. The control system according to claim 4, wherein the at least one friction piece (51, 52) is connected to the main shaft (10) by an assembly device (53) that is capable of preventing the rotation of both the friction piece (51, 52) and the main shaft (10) around the main axis (X10), the friction piece (51, 52) and the main shaft (10) without clearance relative to one another, and the assembly device (53) resiliently pressing the at least one friction piece (51, 52) against the second gear wheel (45.2).

7. The control system according to claim 1, wherein the brake (43) is a friction brake preventing, by friction, the mechanical output (42) of the geared motor assembly (41) from being moved.

8. The control system according to claim 1, wherein the brake (43) is passive, so as to apply the second resistance both when the geared motor assembly (41) moves the mechanical output (42) and when the geared motor assembly (41) does not move the mechanical output (42).

9. The control system according to claim 1, wherein the brake (43) is active, so as to apply the second resistance only when the geared motor assembly (41) does not move the mechanical output (42).

10. The control system according to claim 1, wherein the brake (43) is designed so that in case of seizing of the friction link (50), the second resistance can be exceeded by the pilot acting manually on the lever (30) to rotate the main shaft (10) around the main axis (X10).

* * * * *